(12) United States Patent
Chancellor

(10) Patent No.: US 6,547,965 B1
(45) Date of Patent: Apr. 15, 2003

(54) LARGE TUBE ASSEMBLIES FOR REVERSE OSMOSIS

(75) Inventor: Dennis Chancellor, Falls of Rough, KY (US)

(73) Assignee: Nate International, Woodland Hills, CA (US)

( * ) Notice: Subject to any disclaimer, the term of this patent is extended or adjusted under 35 U.S.C. 154(b) by 0 days.

(21) Appl. No.: 09/622,796
(22) PCT Filed: Feb. 25, 1999
(86) PCT No.: PCT/US99/04058
§ 371 (c)(1), (2), (4) Date: Sep. 19, 2000
(87) PCT Pub. No.: WO99/43421
PCT Pub. Date: Sep. 2, 1999

Related U.S. Application Data

(63) Continuation of application No. PCT/US98/07383, filed on Apr. 13, 1998
(60) Provisional application No. 60/076,110, filed on Feb. 27, 1998, provisional application No. 60/087,615, filed on Jun. 2, 1998, and provisional application No. 60/102,764, filed on Oct. 2, 1998.

(51) Int. Cl.[7] .............................................. B01D 61/06
(52) U.S. Cl. ............... 210/321.66; 210/258; 210/323.1; 210/416.1; 210/433.1
(58) Field of Search ........................ 210/195.2, 252, 210/258, 323.1, 323.2, 321.66, 340, 341, 416.1, 485, 641, 652, 433.1

(56) References Cited

U.S. PATENT DOCUMENTS

| | | | | |
|---|---|---|---|---|
| 3,489,159 A | * | 1/1970 | Cheng et al. | |
| 4,125,463 A | * | 11/1978 | Chenoweth | 210/460 |
| 4,321,137 A | * | 3/1982 | Kohler | 210/137 |
| 4,702,842 A | * | 10/1987 | Lapierre | 210/651 |
| 4,973,408 A | * | 11/1990 | Keefer | 210/652 |
| 4,983,305 A | * | 1/1991 | Oklejas et al. | 210/321.66 |
| 5,470,469 A | * | 11/1995 | Eckman | 210/321.8 |

FOREIGN PATENT DOCUMENTS

| | | | |
|---|---|---|---|
| WO | WO 98/09718 | * | 3/1998 |
| WO | WO 98/46388 | * | 10/1998 |

\* cited by examiner

*Primary Examiner*—John Kim
(74) *Attorney, Agent, or Firm*—Rutan & Tucker, LLP; Sandra P. Thompson, Esq.; Robert D. Fish, Esq.

(57) ABSTRACT

A modularized filtration system includes multiple production modules mechanically coupled in series to form a production chain, and fluidly coupled by parallel feed fluid, waste fluid, and product fluid flowpaths. The system also includes a turbine, work exchange unit, or other energy recovery device to extract energy from the waste fluid. The system may also advantageously include a pressurization device for pressurizing a feed fluid, and provide a common drive shaft for the energy recovery and pressurization devices.

11 Claims, 6 Drawing Sheets

US 6,547,965 B1

LARGE TUBE ASSEMBLIES FOR REVERSE OSMOSIS

This application is a national stage of PCT/US99/04058 filed Feb. 25, 1999 which claims the benefit of U.S. Provisional Application Nos. 60/076,110 (filed Feb. 27, 1998), 60/087,615 (filed Jun. 2, 1998) and 60/102,764 (filed Oct. 2, 1998) and also claims the benefit of PCT Application Nos.: PCT/US98/07383 filed Apr. 13, 1998, which are all incorporated herein in their entirety.

FIELD OF THE INVENTION

The present invention relates generally to filtration of fluids, including especially filtration of water.

BACKGROUND

There is a great worldwide demand for purified fluids, one of the most commercially important of which is production of fresh water. Many areas of the world have insufficient fresh water for drinking or agricultural uses, and in other areas where plentiful supplies of fresh water exist, the water is often polluted with chemical or biological contaminants, metal ions and the like. There is also a continuing need for commercial purification of other fluids such as industrial chemicals and food juices. U.S. Pat. No. 4,759,850, for example, discusses the use of reverse osmosis for removing alcohols from hydrocarbons in the additional presence of ethers, and U.S. Pat. No. 4,959,237 discusses the use of reverse osmosis for orange juice.

Aside from distillation techniques, purification of water and other fluids is commonly satisfied by filtration. There are many types of filtration, including reverse osmosis (RO), ultra-filtration and hyper-filtration, and all such technologies are contemplated herein within the generic term, "filtration."

Reverse osmosis involves separation of constituents under pressure using a semi-permeable membrane. As used herein, the term membrane refers to a functional filtering unit, and may include one or more semi-permeable layers and one or more support layers. Depending on the fineness of the membrane employed, reverse osmosis can remove particles varying in size from the macro-molecular to the microscopic, and modern reverse osmosis units are capable of removing particles, bacteria, spores, viruses and even ions such as $Cl^-$ or $Ca^{++}$.

There are several problems associated with reverse osmosis (RO), including excessive fouling of the membranes and high costs associated with producing the required pressure across the membranes. These two problems are interrelated in that most or all of the known RO units require flushing of the membranes during operation with a relatively large amount of feed liquid relative to the amount of permeate produced. The ratio of flushing liquid reject to permeate recovery in sea water desalination, for example, is about 3:2. Because only some of the sea water being utilized is recovered as purified water, energy used to remaining water is wasted, creating an inherent inefficiency.

It is known to mitigate the energy cost of filtration pumping by employing a work exchange pump such as that described in U.S. Pat. No. 3,489,159 to Cheng et al. (January 1970) which is incorporated herein by reference. In such systems, pressure in the "waste" fluid that flows past the filter elements is used to pressurize the feed fluid. Unfortunately, work exchange pumps employ relatively complicated piping, and in any event are discontinuous in their operation. These factors add greatly to the overall cost of installation and operation.

It is also known to mitigate the energy cost of filtration pumping by employing one or more turbines to recover energy contained in the "waste" fluid. A typical example is included as FIG. 3 in PCT/ES96/00078 to Vanquez-Figueroa (publ. October 1996), which is also incorporated herein by reference. In that example, a feed fluid is pumped up a mountainside, allowed to flow into a filtration unit partway down the mountain, and the waste fluid is run through a turbine to recover some of the pumping energy.

A more generalized schematic of a prior art filtration system employing an energy recovery turbine is shown in FIG. 1. There a filtration system 10 generally comprises a pump 20, a plurality of parallel permeators 30, an energy recovery turbine 40, and a permeate or filtered fluid holding tank 50. The fluid feed lines are straightforward, with an intake line (not shown) carrying a feed fluid from a pretreatment device (not shown) to the pump 20, a feed fluid line 22 conveying pressurized feed fluid from the pump 20 to the permeators 30, a permeate collection line 32 conveying depressurized permeate from the permeators 30 to the holding tank 50, a waste fluid collection line 34 conveying pressurized waste fluid from the permeators 30 to the energy recovery turbine 40, and a waste fluid discharge line 42 conveying depressurized waste fluid from the energy recovery turbine 40 away from the system 10.

A system according to FIG. 1 may be relatively energy efficient, but is still somewhat complicated from a piping standpoint. Among other things, each permeator 30 has at least three pressure connections—one for the feed fluid, one for the waste fluid, and one for the permeate. In a large system such fluid connections may be expensive to maintain, especially where filtration elements in the permeators need to be replaced every few years.

WIPO publication 98/46338 discloses an improvement in which production modules containing spiral wound filters are mechanically coupled in series, while providing the feed, filtered, and waste fluid flowpaths in parallel. This arrangement, sometimes referred to herein as S/P modularization, allows a series of coupled modules to be conveniently installed, accessed, and removed. WO 98/46338 suggests numerous ways of deploying the modules in space efficient manner, such as by insertion into a deep or shallow well, a tower, along the ground, into the side of a hill or mountain, or even under a road or parking lot. It is also suggested that efficiency in installation and removal can be enhanced by mating adjacent production modules with one another using a slip fit joint, and that the production modules may be maintained in mating relationship through connections to supporting cables or rods.

WIPO Publication WO 98/46338 did not, however, teach mitigating the energy cost of S/P modularized production modules by employing a modularized energy recovery device. Thus, there is a continuing need for a simplified approach to recovering energy costs employed in such systems, especially in large scale systems (at least 1 million gallons per day) in which inefficiencies can be very significant.

SUMMARY OF THE INVENTION

The present invention is directed to modularized filtration systems having an energy recovery device. In preferred embodiments the filtration system is arranged so that multiple production modules mechanically are coupled in series to form a production chain, and each of a common feed fluid flowpath, a common waste fluid flowpath, and a common product flowpath carried along the production chain. In yet another aspect of preferred embodiments the energy recovery device comprises a turbine positioned to extract energy from a flow-by or "waste" fluid. Still more preferred embodiments additionally include a modularized pressurization device for pressurizing a feed fluid, and provide a common drive shaft for the energy recovery and pressurization devices.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
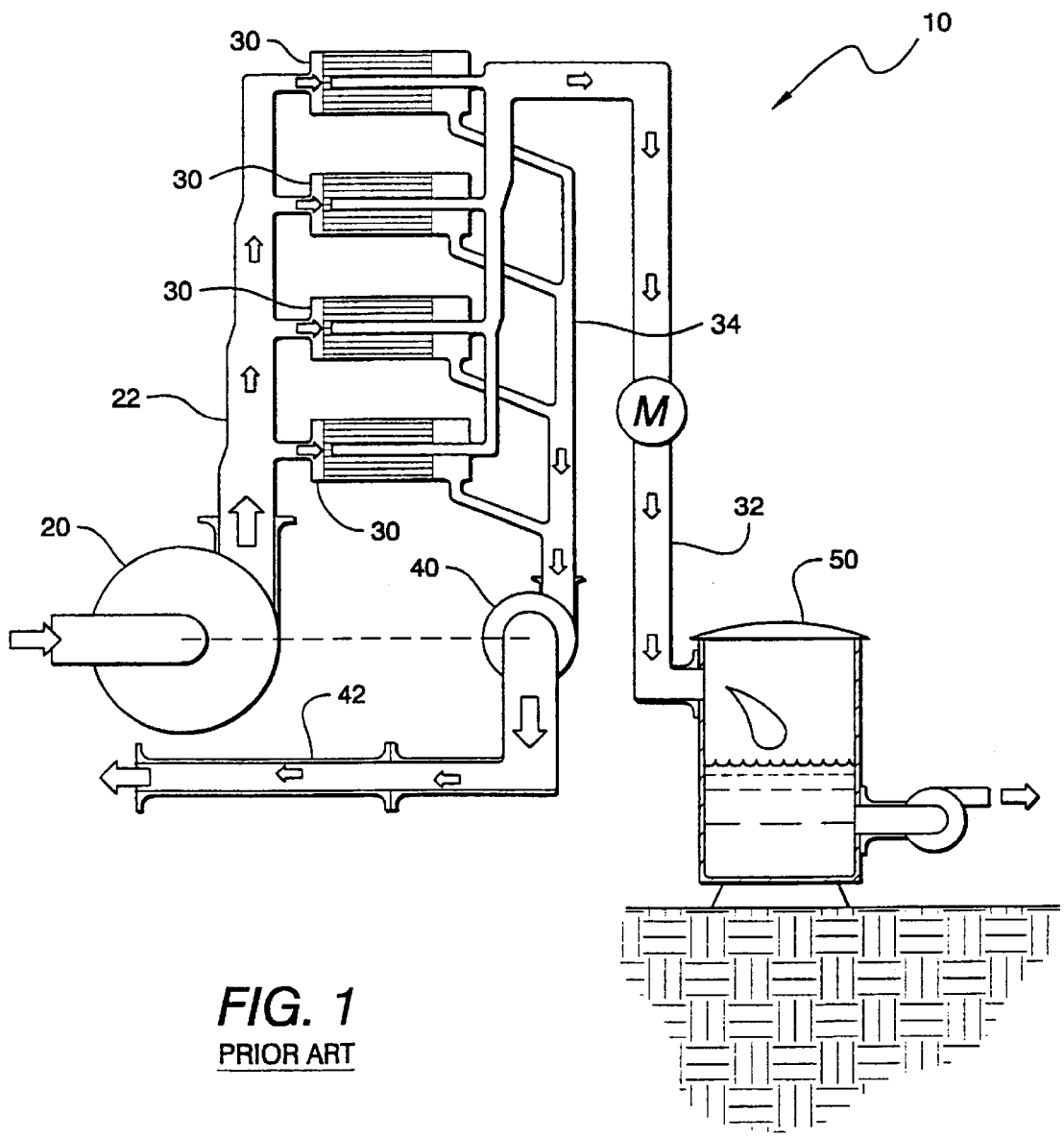
FIG. 1 is a schematic of a prior art filtration system employing an energy recovery turbine.
Figure 2:
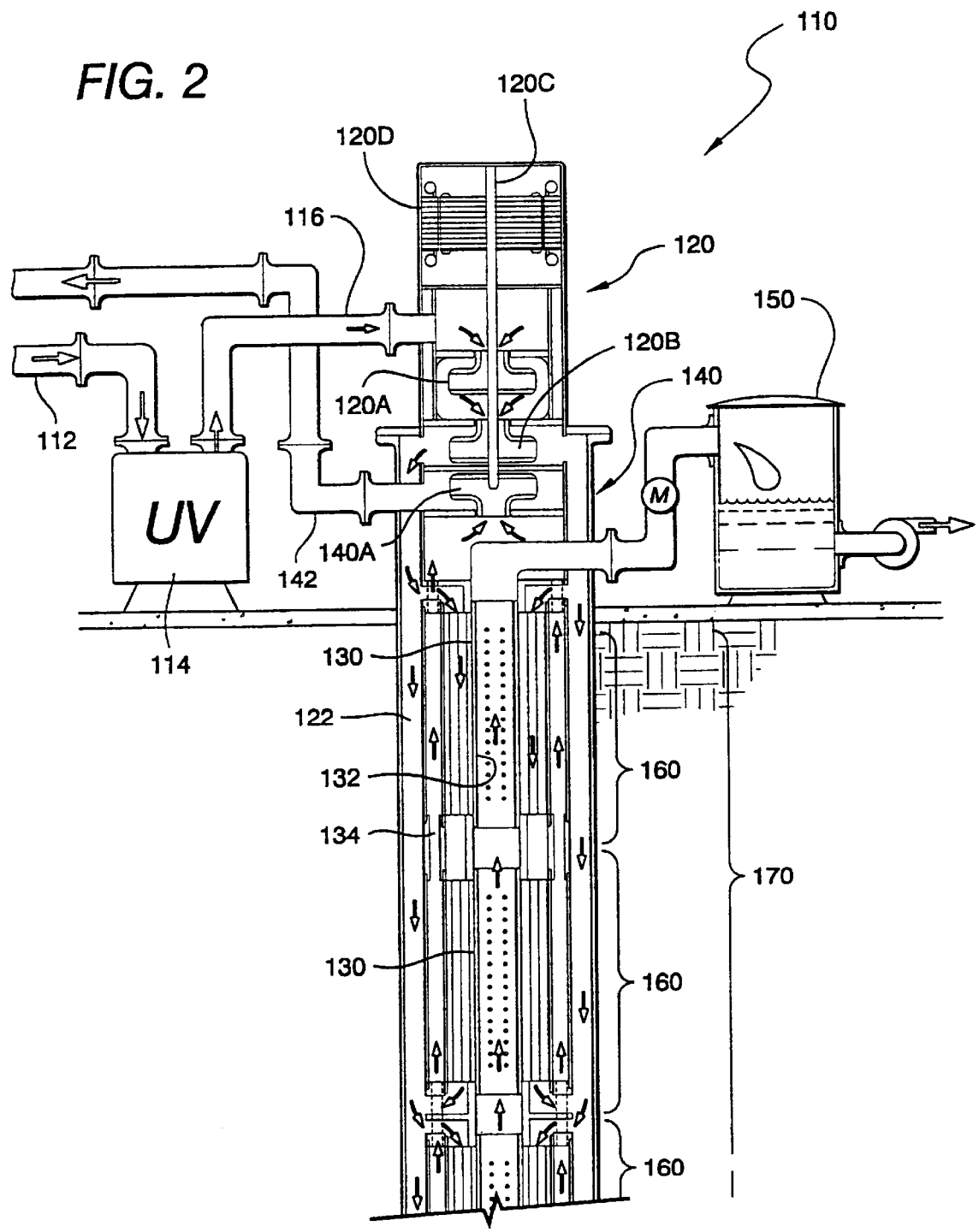
FIG. 2 is a schematic of a filtration system according to the present invention employing an energy recovery device.

In FIG. 2 a preferred filtration system 110 generally comprises a pressurizing device 120, a plurality of reverse osmosis or other filters 130, an energy recovery device 140, and a permeate or filtered fluid holding tank 150. Analogously to FIG. 1, a feed fluid from line 112 enters a pretreatment device 114, and then passes to the pressurizing device 120 via line 116. Upon pressurization, a feed fluid line 122 conveys pressurized feed fluid from the pressurizing device 120 to the permeators 130, a permeate collection line 132 conveys depressurized permeate from the permeators 130 to the holding tank 150, a waste fluid collection line 134 conveys pressurized waste fluid from the permeators 130 to the energy recovery device 140, and a waste fluid discharge line 142 conveys depressurized waste fluid from the energy recovery device 140 away from the system 110. Also analogously to FIG. 1, it is contemplated that the feed fluid may be any fluid amenable to treatment by filtration. In a great many instances the feed fluid will comprise water, or at least an aqueous solution such as salty or briny water. In other instances, the feed fluid may comprise a food, such as orange juice, or perhaps a petroleum intermediary that requires purification.

Quite unlike the filtration system 10 of FIG. 1, however, the filtration system 110 of FIG. 2 contemplates that the various filters 130, and at least portions of feed fluid line 122, permeate collection line 132, and waste fluid collection line 134 are contained within, or at least partially defined by, a series of production modules 160 coupled together in a production chain. In preferred embodiments the production chain may be contained within a channel or casing to form a large tube assembly 170, with the inner walls of the channel or casing cooperating with the production modules to define at least one of the various fluid lines 122, 132 and 134. In any combination or permutation of such embodiments, the feed fluid flowpath, waste fluid flowpath, and product flowpath are all considered to be "carried along" the production chain.

The production modules 160 may advantageously be similar in many respects to the production modules 40 variously described in the WO 98/09718 and WO 98/46338 publications, although here there is less constraint on the diameter than previously contemplated. In addition, the production modules 160 are contemplated to be disposed in any relationship to vertical, including vertical, off-vertical, and even horizontal. As such, the large tube assembly 170 may be disposed more or less horizontally on, above or below the surface of the ground, or in some other configuration such as a partially buried disposition. In other contemplated embodiments, for example, the large tube assembly 170 may be set into a shallow well, perhaps less than 100 or even less than 50 feet deep. In still other embodiments, the large tube assembly 170 may be disposed within or as part of a tower, hillside or mountain. In yet another aspect, multiple large tube assemblies 170 may be coupled together to form a field of assemblies (not shown), in any combination of dispositions.

The filter portion is preferably spiral wound, as for example, depicted in WO 98/09718. In other embodiments, however, any other types of filters can be employed. Thus, it is expressly contemplated to employ flat membrane, tubular, spiral, and/or hollow tube type filters. Hollow type filters can, for example, be deployed in a manner similar to that described in U.S. Pat. No. 5,470,469 to Eckman (November 1995).

Turning in greater detail to the pressurizing device 120, it is contemplated that any pump or pump system which provides adequate pumping volume and pressure may be employed in filtration system 110 to pressurize the feed fluid. This includes positive displacement pumps, impeller pumps, head pressure devices, and many others. On the other hand, some pumps and pumping systems will be more efficient than others, and such pumps and systems are particularly contemplated. A particularly efficient pumping system is a two stage turbine pump, such as that depicted in FIG. 2. Here, feed fluid flows first to a relatively low pressure turbine 120A, and then on to a relatively high pressure turbine 120B. The low and high pressure turbines 120A, 120B may advantageously derive power from a single drive shaft 120C and motor 120D, although other embodiments having multiple drive shafts and/or multiple motors are also contemplated.

Energy recovery device 140 may take many different forms, including positive displacement devices (not shown). In FIG. 2, for example, energy recovery device 140 incorporates a turbine 140A, which receives pressurized waste fluid from the production modules 160.

Figure 3:
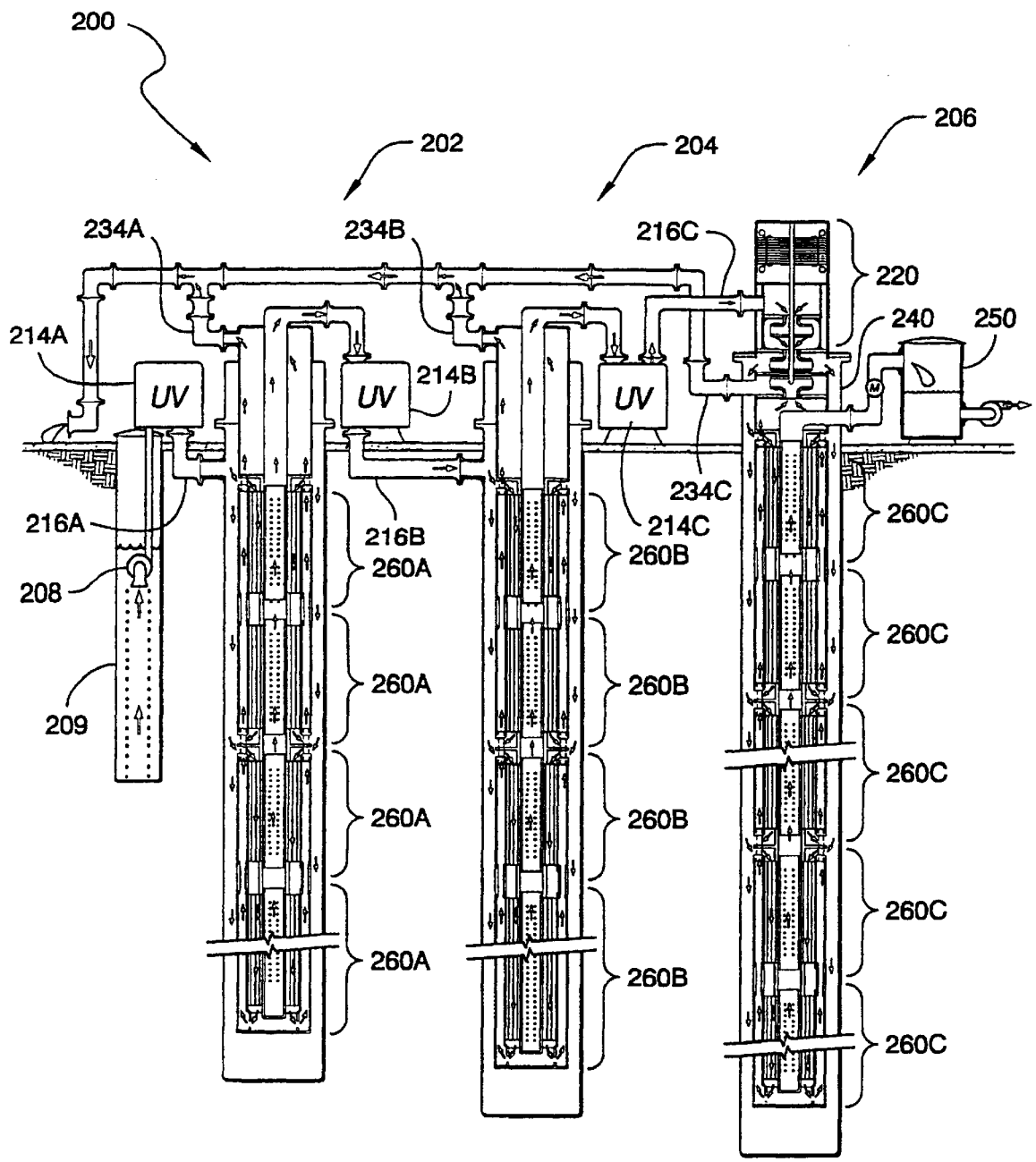
FIG. 3 is a schematic of a field of filtration systems according to the present invention.
Figure 4:
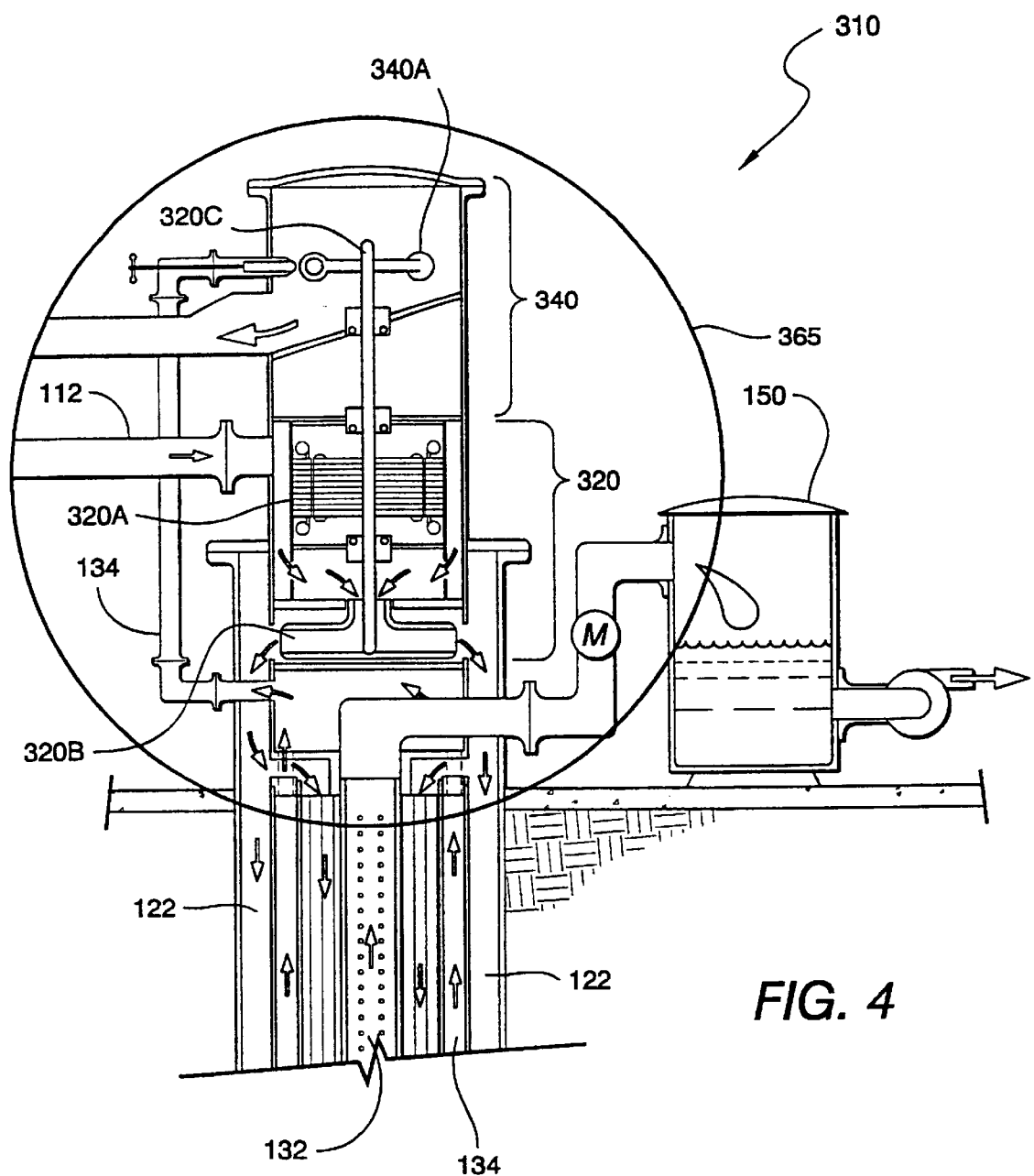
FIG. 4 is a schematic of a filtration system according to the present invention employing an energy recovery device and a submersible pump.

Energy recovery device 140 may take many different forms, including positive displacement devices (not shown), turbine devices (not shown), or a pelton wheel 130A (depicted in FIG. 4). Energy recovery device 140 is also preferably modularly coupled to the pressurizing device 120. In the particular embodiment of FIGS. 2 and 3, modularization occurs by disposing both pressurizing device 120 and energy recovery device 140 in a common power module 165, and further by utilizing the pump drive shaft to drive shaft 120C to transfer power from the energy recovery device to the pump 120A, 120B. In alternative embodiments, modularization may also occur by disposing the pressurizing device 120 and the energy recovery device 140 in separate power modules (not shown), which may advantageously be coupled by a common drive train.

There are numerous contemplated advantages to modularization. Modularization of the filters and flow lines into production modules, for example, is highly advantageous because it facilitates construction of filtration systems which are physically disposed in a serial fashion, but are fluidly disposed in a parallel fashion. Such systems are inherently cost effective to build and maintain relative to traditional systems such as that depicted in FIG. 1. Modularization of the pressurizing and energy recovery devices is also advantageous from a cost effectiveness standpoint. Among other things, such power modules can be readily inserted and replaced in a given filtration system, and can be substituted interchangeably with corresponding modules in a field of such filtration systems.

Some of these advantages can be more readily visualized from consideration of FIG. 3. In FIG. 3 a field 200 of filtration systems comprises a first micro-filtration system 202, a second, ultra-filtration or non-filtration system 204, and a third, hyper-filtration or reverse osmosis system 206. Many of the parts may advantageously be modularized to enhance interchangeability and cost-effectiveness. For example, each of the filtration systems may have a pretreatment device 214A, 214B and 214C, which in this case may be an ultra-violet or other bactericidal unit. Feed fluid for all of the filtration systems 202, 204 and 206 in the field 200 is provided by well 209, and is pumped to the first pretreatment device 214A by pump 208. The feed fluid then passes to the first filtration system 202 via line 216A, where the feed fluid is filtered in production modules 260A. Waste fluid leaves the first filtration system 202 via line 234A. Permeate from the first filtration system 202 is carried to the second filtration system 204 via line, where further filtration occurs in production modules 260B. Waste fluid leaves the second filtration system 204 via line 234B. Permeate from the second filtration system 204 is carried to the third filtration system 206 via line 216C. At the third filtration system 206, the relatively purified fluid is pressurized by pressurizing device 220, and is further filtered in production modules 260C. Waste fluid leaves the third filtration system 206 via line 234C. Permeate from the third filtration system 206 depressurized using energy recovery device 240, and then passes to holding tank 250.

Of course, the arrangement of systems set forth in FIGS. 2 and 3 are exemplary only, and many other arrangements are contemplated. For example, FIG. 3 depicts a field 200 in which a feed fluid is progressively more filtered across several serially arrayed filtration systems. In alternative embodiments it may be more appropriate to filter a feed fluid only once, so that the various filtration systems act in parallel rather than series. In yet additional alternative embodiments, a field may employ numerous sources of feed fluid, such as via multiple wells as opposed to a common well. In still further alternative embodiments, the various filtration systems may be disposed in differing attitudes relative to the landscape. For example, some of the systems may be set mostly underground, while others may be near ground level, or disposed in a tower.

Many of the parts may advantageously be modularized to enhance interchangeability and cost-effectiveness. For example, each of the filtration systems may have a pretreatment device 214A, 214B, 214C, which in this case may be an ultra-violet or other bactericidal unit. Feed fluid for all of the filtration systems 202, 204 in the field 200 is provided by well 209, and is pumped to the first pretreatment device 214A by pump 208. The feed fluid then passes to the first filtration system 202 via line 216A, where the feed fluid is filtered in production modules 260A. Waste fluid leaves the first filtration system 202 via line 134A. Permeate from the first filtration system 202 is carried to the second filtration system 204 via line 216B. Waste fluid leaves the second filtration system 204 via line 134B, passing through the energy recovery device (not shown). Permeate from the second filtration system 204 passes via line 216C to third filtration system 206, which includes energy recovery module 240.

In FIG. 4 a filtration system 310 includes a pressurizing device 320 and an energy recovery device 340 are disposed in a common power module 365. The pelton wheel or ERT 340A recovers energy from the waste fluid in waste fluid collection line 134, and provides added power to drive submersible pump (not shown) via common drive shaft 320C.

Figure 5:
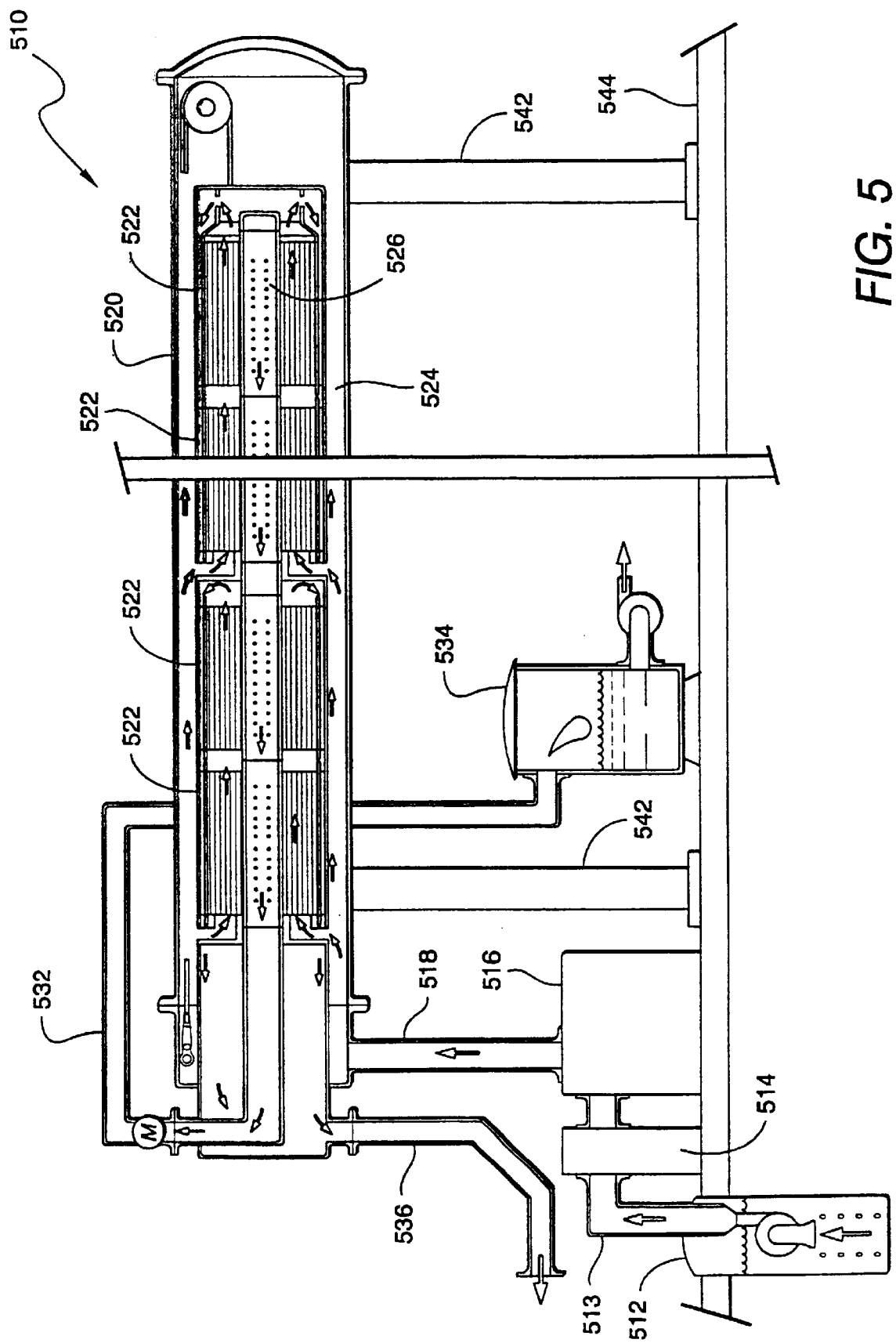
FIG. 5 is a schematic of a filtration system in horizontal configuration according to the present invention employing a work exchange pump.

In FIG. 5, a series of production modules 522 are coupled together to form a large tube assembly 510. The production modules 522 may advantageously be similar in many respects to the production modules 540 described in the U.S. Pat. No. 5,944,999 issued to Chancellor et al. (Aug. 31, 1999), although here there is less constraint on the diameter than previously contemplated. In addition, the production modules 522 are contemplated to be disposed in any relationship to vertical, including vertical, off-vertical, and even horizontal. As such, the large tube assembly 510 may be disposed more or less horizontally on, above or below the surface of the ground, or in some other configuration such as a partially buried disposition. In other contemplated embodiments, the large tube assembly 510 may be set into a shallow well, perhaps less than 100 or even less than 50 feet deep. In still other embodiments, the large tube assembly may be disposed within or as part of a tower, hillside or mountain. In yet another aspect, multiple large tube assemblies 510 may be coupled together to form a field of assemblies, in any combination of dispositions.

Preferred operation is similar to that described in the WO 98/09718 application, except that the majority of the pressure required to operate the membranes is contemplated to derive from some source other than head pressure. Thus, in FIG. 5 a liquid may be drawn or pumped up from a well head or other source 512, through an input line 513 and into an optional pretreatment unit 514. While the liquid will generally be water or at least an aqueous solution such as salty or briny water, and portions of the description herein uses salty or briny water as an example, it will be appreciated that virtually any liquid may be purified by the apparatus and methods described herein.

From the pretreatment unit 514 the salty or briny water passes through a high pressure work exchange pump 516, which may be employed to impart additional pressure to the water, and passes the water into production modules 522. In this particular example, the salty or briny water flows along passageways 524, with some of the water flowing through a membrane to form permeate which passes through passageway 526, while the remainder of the water passes out exhaust pipe 536. The permeate in passageway 526 then flows through pipe 532 to storage tank 534.

As discussed above the large tube assembly 510 can be disposed in virtually any position, but is here raised several feet above the ground by supports 542. There may also be a supporting floor 544 of concrete or other ground covering.

Figure 6:
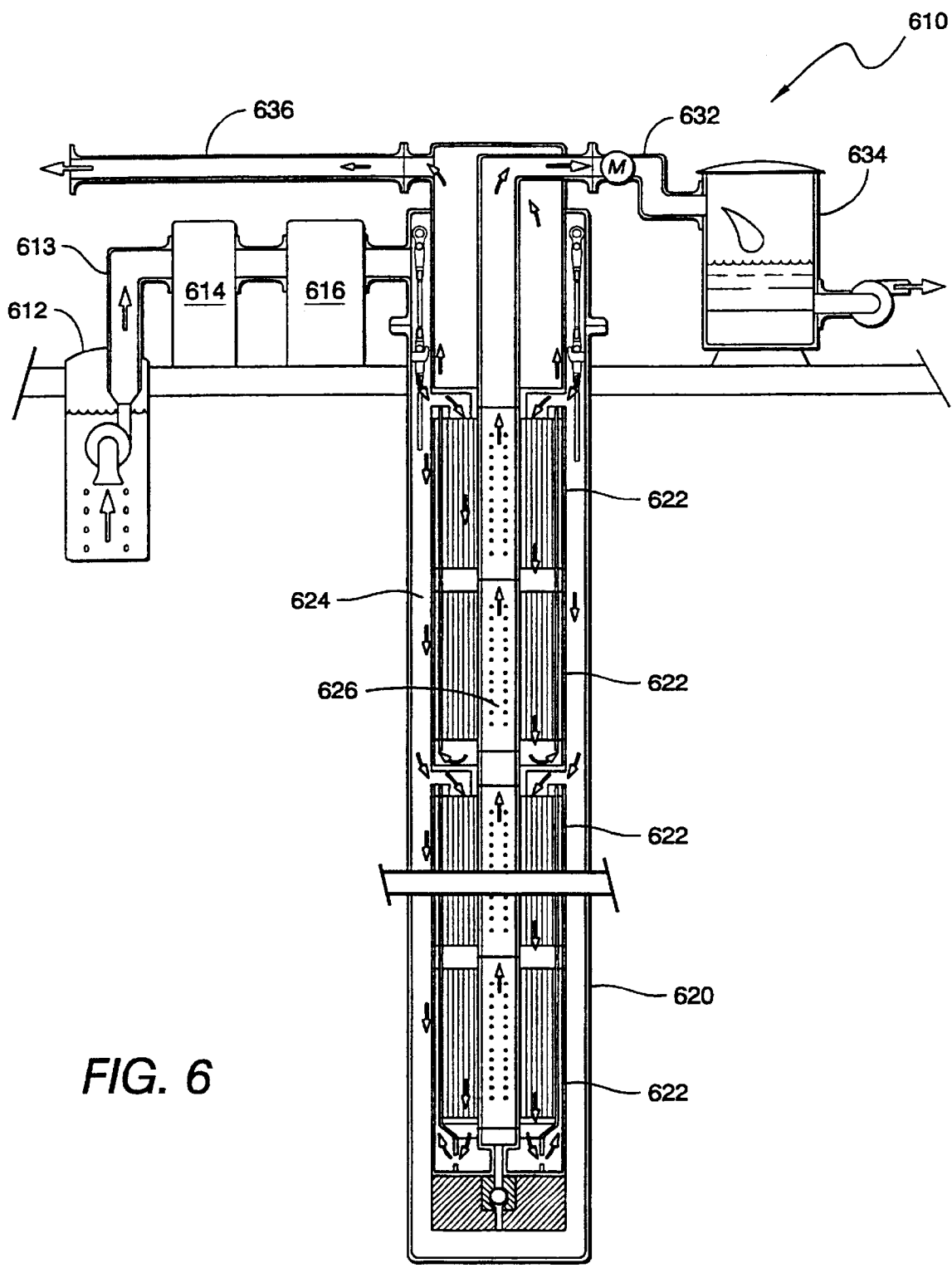
FIG. 6 is a schematic of a filtration system in vertical configuration according to the present invention employing a work exchange pump.

FIG. 6 depicts a similar arrangement, where the large tube assembly 610 is disposed vertically in a shallow well. To assist in comparison, each of the elements has been denoted using the same numbering system as for FIG. 5, with the exception that each of the numerals has been increased by 100.

Turning in greater detail to the high-pressure pumps, 516, 616, it is contemplated that any pump or pump system that provides adequate pumping volume and pressure can be employed. This includes positive displacement pumps, impeller pumps and many others. On the other hand, some pumps and pumping systems will be more efficient than others, and such pumps and systems are particularly contemplated. Pumping systems such as work exchange systems disclosed in U.S. Pat. No. 3,489,159 which recover energy from high-pressure waste fluid are presently preferred.

Thus, specific embodiments and applications of a filtration system with a modularized energy recovery system have been disclosed. It should be apparent to those skilled in the art, however, that many more modifications besides those already described are possible without departing from the inventive concepts herein. The inventive subject matter, therefore, is not to be restricted except in the spirit of the present disclosure.

What is claimed is:

1. A filtration system comprising:
   at least two production modules mechanically coupled in series and fluidly coupled in parallel to form a production chain;
   each production module having a common feed fluid flowpath, a common waste fluid flowpath, and a common product flowpath carried along the production chain;
   an energy recovery device fluidly coupled to the at least two production modules that derives energy from a waste fluid in the waste fluid flowpath; and
   a pressure pump coupled to the production chain to provide pressurized fluid to the production modules.

2. The filtration system of claim 1 further including a drive shaft coupled to the energy recovery device whereby at least a portion of the energy derived from the waste fluid is employed to pressurize the feed fluid.

3. The filtration system of claim 1 further including a pressurization device that is modularly coupled to the energy recovery device and that assists in pressurizing the feed fluid.

4. The filtration system of claim 1 wherein the energy recovery device comprises a pelton wheel.

5. The filtration system of claim 1 wherein the energy recovery device comprises a work exchange pump.

6. The filtration system of claim 1 wherein the energy recovery device comprises a turbine.

7. The filtration system of claim 1 wherein the production chain includes at least 3 of the production modules.

8. The filtration system of claim 1 wherein the production chain includes at least 5 of the production modules.

9. The filtration system of claim 1 wherein the production chain is inserted into an elongated casing.

10. The filtration system of claim 9 wherein the casing is disposed substantially below ground level.

11. The filtration system of claim 9 wherein the casing is disposed substantially above ground.

* * * * *